United States Patent Office 3,347,904
Patented Oct. 17, 1967

3,347,904
DIFLUOROAMINO ALIPHATIC DINITRATES
Robert A. Smiley, Woodbury, N.J., assignor to E. I. du Pont de Nemours and Company, Wilmington, Del., a corporation of Delaware
No Drawing. Filed Sept. 6, 1961, Ser. No. 137,939
7 Claims. (Cl. 260—467)

This application is a continuation-in-part of my copending application Serial No. 115,823 filed June 8, 1961.

This invention relates to aliphatic dinitrates containing difluoroamino (—$NF_2$) substituents and to a process for their preparation.

Compounds which contain —$NF_2$ and —$ONO_2$ groups are sources of much energy and consequently find use as ingredients for rocket propellants and explosives. While one method of preparing compounds of this type is the esterification of an alcohol containing —$NF_2$ groups by nitric acid, this method is not practical in those cases where the alcohols are so unstable that they cannot be effectively purified and stored. Some of these alcohols cannot be distilled from mixtures to obtain the pure alcohol. A further disadavntage of the use of these alcohols as reactants is that the low degree of stability of the alcohols on storage demands that they be prepared immediately prior to use. The use of difluoramino-substituted alcohols in chemical reactions furthermore is undesirable because of the extreme corrosiveness of the alcohols.

I have now found that aliphatic dinitrates containing difluoramino substituents can be prepared in a procedure which obviates the need for the unstable difluoramino-substituted alcohols by reacting 1,3-dioxolanes containing difluoramino substituents with a nitrating acid. Specifically, the difluoroamino-substituted dioxolanes used as the starting materials in this process are 1,3-dioxolanes having a difluoramino-substituted alkyl group attached to the 4- and/or 5-positioned carbon atom of the dioxolane ring, only hydrogen atoms on the 2-positioned carbon atom, and at least one pair of difluoramino substituents, the two substituents of any one pair being attached to adjacent carbon atoms, both of which are members of the aforesaid alkyl group. These compounds can be represented by the formula:

(1)

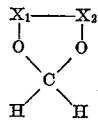

wherein $X_1$ and $X_2$ are independently selected, and $X_1$ is $>CH—CR_1(NF_2)—CR_1(R_2)(NF_2)$ or $>CH—(CH_2)_n—CR_1(NF_2)—CR_1(R_2)(NF_2)$; and $X_2$ is $>CH_2$, $>CH—CR_1(NF_2)—CR_1(R_2)(NF_2)$, or $>CH—(CH_2)_n—CR_1(NF_2)—CR_1(R_2)(NF_2)$; $R_1$ and $R_2$ are H or a lower, e.g., 1–3 carbon, alkyl radical; and $n$ is an integer from 1 to 3. Such difluoroamino-substituted dioxolanes and their preparation are described in detail in the co-pending application, Serial No. 137,938 filed Sept. 6, 1961 by R. K. Armstrong and M. L. Peterson and assigned to the present assignee.

When the above-described substituted dioxolanes are reacted with a nitrating acid, the dioxolane ring is cleaved with the formation of an acyclic aliphatic dinitrate, the two nitrate groups being attached to adjacent carbon atoms, i.e., the carbon atoms which occupy the 4- and 5-positions in the substituted dioxolane used as the starting material. The difluoramino-substituted aliphatic dinitrates formed can be represented by the formula:

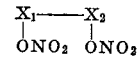

wherein $X_1$ and $X_2$ are independently selected, and have the same significance as detailed above with reference to Formula 1.

Typical of the difluoramino-substituted dinitrates of the invention are, for example, 3,4-bis(difluoramino)-1,2-butanediol dinitrate and 1,2,5,6-tetrakis(difluoramino)-3,4-hexanediol dinitrate.

The nitrating acid used in the process of the invention is preferably a mixed acid, i.e., nitric acid admixed with an agent which assists in the formation of the nitronium ion, $NO_2^+$. The mixed acid can be nitric acid admixed with sulfuric acid, acetic acid, acetic anhydride, trifluoroacetic anhydride, etc. For economic reasons, however, the use of a nitric acid-sulfuric acid mixture is preferred. Mixtures having percent compositions corresponding to those ordinarily used in nitration reactions can be used, e.g., mixtures ranging from 20% $HNO_3$/60% $H_2SO_4$/20% $H_2O$ to 55% $HNO_3$/48% $H_2SO_4$ (said to have a negative percentage of water, −3%).

The amount of nitric acid used in the present process is at least two moles per mole of difluoramino-substituted dioxolane, i.e., the stoichiometric amount required to add the —$NO_2$ group to both of oxygen atoms of the dioxolane. However, an excess preferably a large excess, of nitric acid generally will be used in order to assure complete reaction. The mole ratio of nitric acid to dioxolane can range from 2/1 to about 50/1 or more.

While it is not necessary that the reaction of the above-described difluoramino-substituted dioxolanes with a nitrating acid be effected in the presence of a diluent, preferably an inert liquid diluent will be used to assist in dissipating the heat of reaction and in decreasing the oxidizing action of the nitric acid. Preferably, the inert diluent is a low-boiling compuond, such as one of the halogenated hydrocarbons, e.g., chloroform or methylene chloride.

The present process preferably is carried out at a temperature within the range of about 0° C. to about 75° C., temperatures of about room temperature or lower being particularly preferred. While temperatures below 0° C. can be used, they generally are not practical because of the low reaction rate and the cooling required. Temperatures above 75° C. can be used, but operation at such temperatures generally is undesirable inasmuch as the dinitrates often are not stable at these temperatures and yield losses result. The process can be effected at atmospheric as well as superatmospheric pressure. Generally, however, there is no advantage in operating at superatmospheric pressure unless a low-boiling diluent is used.

The following examples illustrate the process of the invention. Parts are by weight. The examples will be understood to be illustrative only and not to limit the invention in any manner.

Example 1

4-[1,2-bis(difluoramino)ethyl]-1,3-dioxolane was prepared by introducing tetrafluorohydrazine under an initial pressure of 90 p.s.i.g. into a solution of 5.0 parts of 4-vinyl-1,3-dioxolane in 112 parts of chloroform, and maintaining the mixture at 100° C. for 30 minutes. The reaction mixture was then cooled and distilled, the desired difluoramino-substituted dioxolane boiling at 45° C. at 1 mm.

The thus-prepared 4-[1,2-bis(difluoramino)ethyl]-1,3- dioxolane (6 parts) was dissolved in 53 parts of methylene chloride, the solution was cooled to 0° C. in an ice-bath, and 20 parts of a mixture of 50% nitric acid and 50% sulfuric acid (by weight) was added to the stirred solution, stirring being continued for 15 minutes. The mixture then was brought to room temperature and stirred for 45 minutes. The mixture was again cooled to 0° C. and 20 parts of urea added slowly. After the addition of the urea was complete, the mixture was stirred at room temperature for 2 hours, after which time the solids were filtered off and the product distilled in vacuo to remove low-boiling components. Two parts of pentaphenyl ether was then added as a stabilizer, and the mixture distilled at 0.2 mm. to give 7 parts of a colorless liquid boiling at 78–82° C. Vapor-phase chromatography showed this liquid to consist of a single compound, which was identified as 3,4-bis(difluoramino)-1,2-butanediol dinitrate, i.e.,

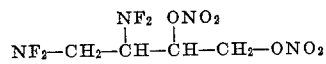

The infrared spectrum of the compound showed strong nitrate absorption at $5.95\mu$ and $7.80\mu$. The fluorine resonance spectrum showed the presence of —$CH_2NF_2$ and —$CNHF_2$. The area under the —$CH_2NF_2$ absorption curve was equal to the area under the —$CHNF_2$ absorption curve, indicating the presence of —$CH_2NF_2$ and —$CHNF_2$ groups in equal numbers. Mass ion fragments found were: 30 ($NO^+$), 46 ($NO_2^+$), 33($NF^+$), 66 ($^+CH_2$—$NF_2$), 76 ($^+CH_2$—$ONO_2$), 79

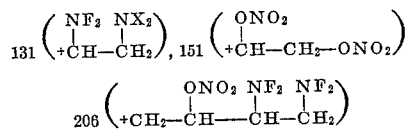

and

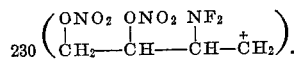

3,4 bisdifluoramino)-1,2-butanediol dinitrate is an explosive compound as well as a propellant as evidenced by the following properties:

*Sensitivity to heat.*—The compound fumes off at 250° C. when heated gradually (ca. 5° C./minute) in a copper block. It flashes immediately when dropped onto a metal bar heated to 250° C.

*Impact sensitivity.*—The impact sensitivity of the compound was determined by dropping a 1-kg. weight onto the compound. The distance the weight had to drop to produce explosion in 50% of the trials was 7.25 cm.

*Static sensitivity.*—The compound is insensitive to static; it required a 51,600 man-equivalent-volt charge to fire it (1 man-equivalent-volt=energy of a condenser of 0.003 microfarad capacitance charged to a potential of 1 volt).

*Brisance.*—The compound was placed in a 0.25-in. diameter shell, the shell placed on end on a lead plate 1.5 in. x 1.5 in. x 5/32 in. thick, and the compound initiated by a blasting cap. A No. 4 hole was produced in the plate, indicating that the compound has explosive power.

*Example 2*

4,5-bis-[1,2-bis(difluoramino)ethyl]-1,3-dioxolane was prepared by introducing tetrafluorohydrazine under an initial pressure of 76 p.s.i.g. into a solution of 6.3 parts of 4,5-divinyl-1,3-dioxolane in 112 parts of chloroform, and maintaining the mixture at 100° C. for 2.5 hours. The reaction mixture was then cooled and distilled, the desired difluoramino-substituted dioxolane boiling at 75–78° C. at 0.2 mm.

The thus-prepared 4,5-bis[1,2-bis(difluoramino)ethyl]-1,3-dioxolane (10.3 parts) was dissolved in 94 parts of methylene chloride, the solution was cooled to 0° C. in an ice-bath, and 34 parts of a mixture of 50% nitric acid and 50% sulfuric acid (by weight) was added to the stirred solution, stirring being continued for 10 minutes. The mixture then was brought to room temperature and stirred for one hour. The methylene chloride layer was decanted, the acid layer stirred with 67 parts of methylene chloride, and the methylene chloride layer again decanted. The methylene chloride layers were combined, and kept overnight over solid urea and magnesium sulfate. After filtration, the methylene chloride was removed under vacuum, leaving a light-yellow viscous liquid, the infrared and nuclear magnetic resonance spectra of which are identical to the spectra of 1,2,5,6-tetrakis(difluoramino)-3,4-hexanediol dinitrate prepared by the process of my co-pending application, Serial No. 115,823 filed June 8, 1961.

The invention has been described in detail in the foregoing. It will be apparent to those skilled in the art that many variations are possible without departure from the scope of the invention. Therefore, I intend to be limited only by the following claims.

I claim:

1. A process for the preparation of aliphatic dinitrates having the nitrate groups on adjacent carbon atoms and containing difluoramino substituents which comprises reacting a nitrating acid with a 1,3-dioxolane having only hydrogen atoms on the carbon atom in the 2-position of the dioxolane ring, a difluoramino-substituted alkyl group attached to at least one of the carbon atoms of the dioxolane ring in the 4- and 5-positions, and at least one pair of difluoramino substituents, the two substituents of said pair being attached to adjacent carbon atoms, both of which are members of said alkyl group.

2. A process according to claim 1 wherein the nitrating acid is a mixture of nitric acid and sulfuric acid.

3. A process according to claim 1, wherein a temperature in the range of about 0° C. to about 75° C. in maintained.

4. A process according to claim 1, wherein an inert diluent is present during the reaction.

5. Difluoramino-substituted saturated aliphatic dinitrates having the nitrate groups on adjacent carbon atoms and at least one pair of difluoramino substituents, the two substituents of said pair being attached to adjacent carbon atoms, and the carbon atoms to which the difluoramino substituents are attached being distinct from the carbon atoms to which the nitrate groups are attached 6. A compound represented by the formula

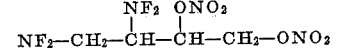

7. A compound represented by the formula

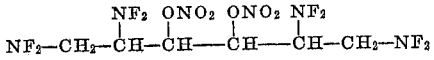

References Cited

Hoffman, et al., Chem. Reviews, vol. 62, pp. 1 to 18 (1962).

CARL D. QUARFORTH, *Primary Examiner.*

LEON D. ROSDOL, ROGER L. CAMPBELL,
*Examiners.*

J. W. WHISLER, L. A. SEBASTIAN,
*Assistant Examiners.*